UNITED STATES PATENT OFFICE.

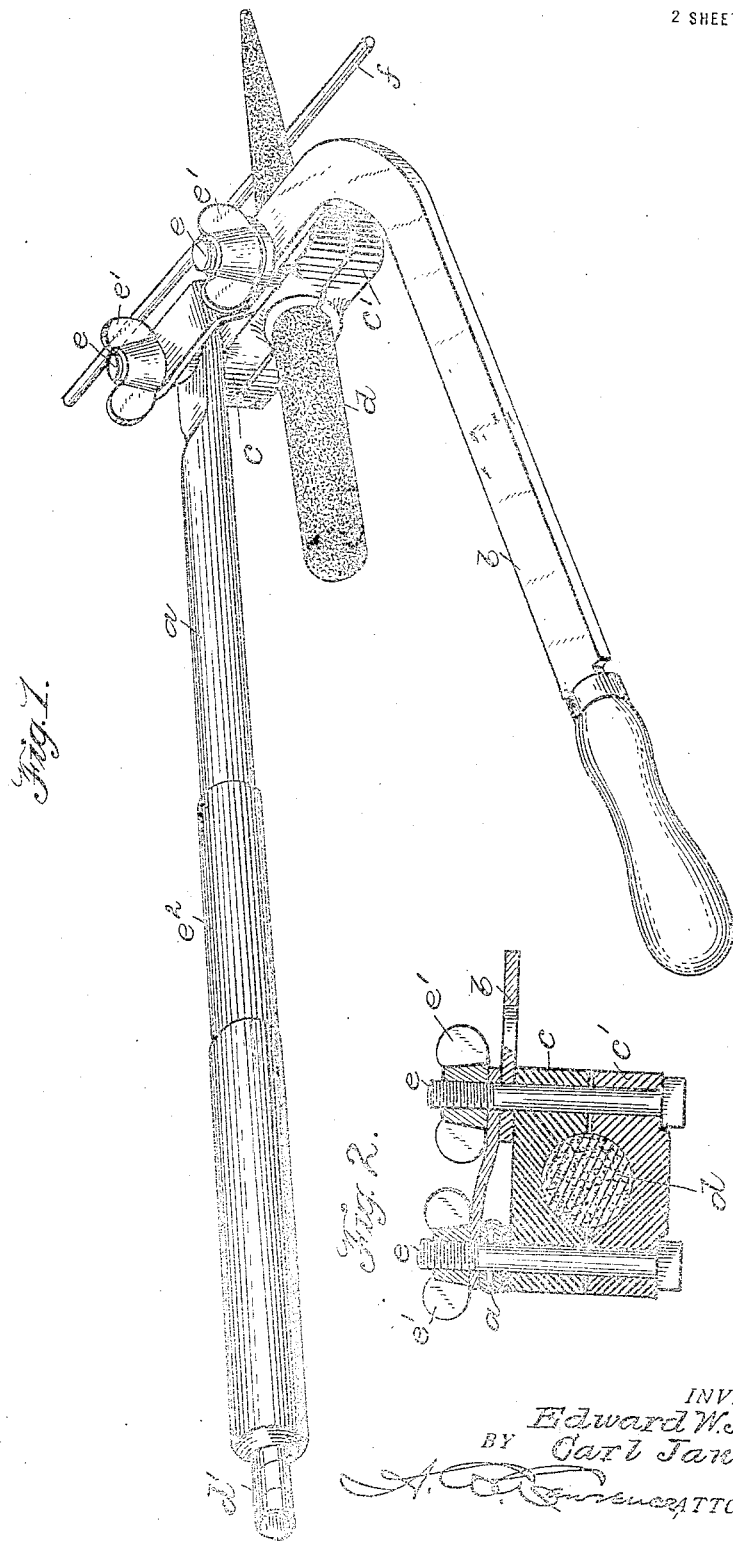

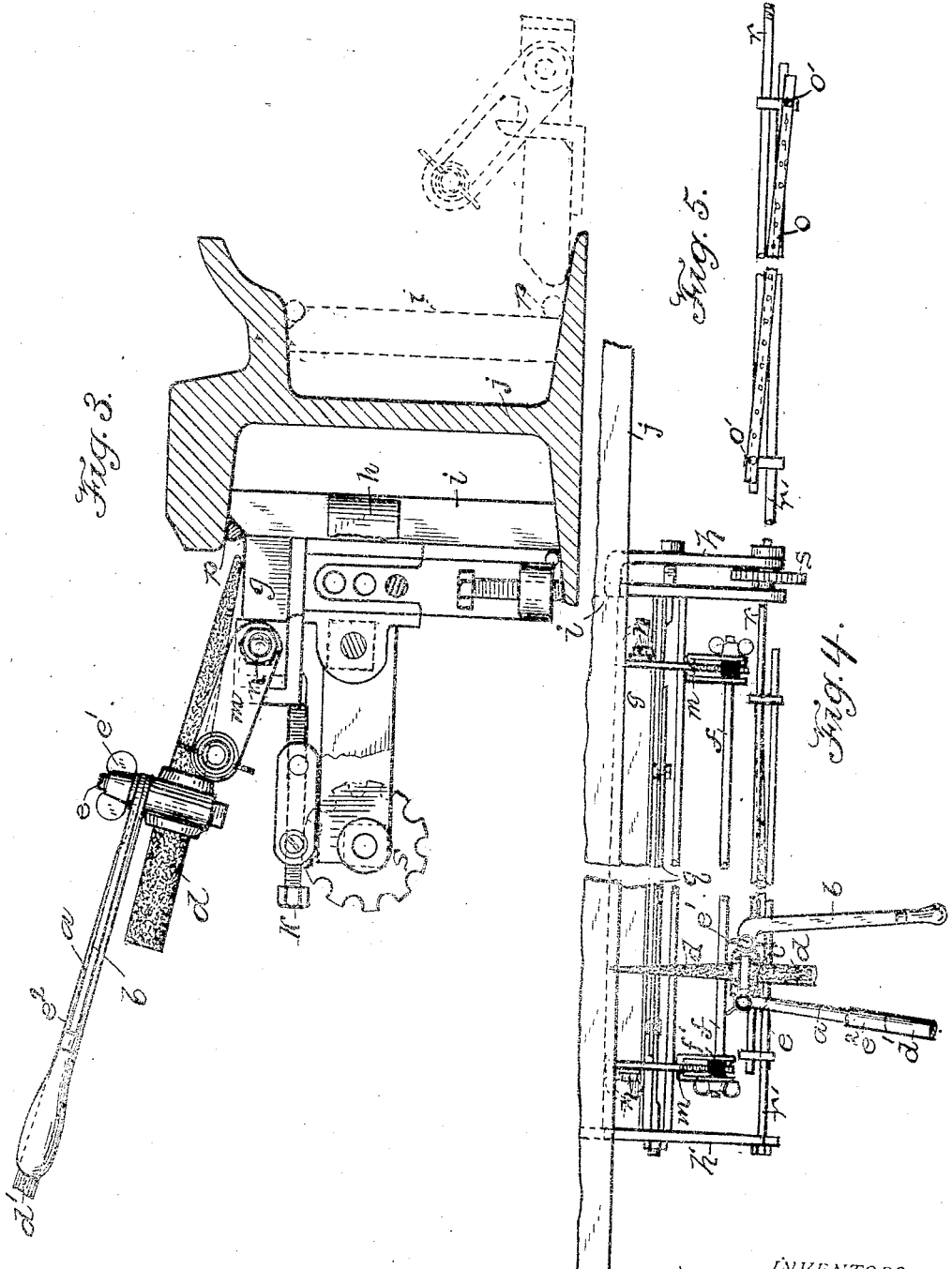

EDWARD W. JANSEN, OF NEW YORK, N. Y., AND CARL JANDY, OF JERSEY CITY, NEW JERSEY, ASSIGNORS, BY MESNE ASSIGNMENTS, TO WILLIAM WAIT SNOW, OF NEW YORK, N. Y.

APPARATUS FOR ELECTRIC WELDING.

1,372,432.  Specification of Letters Patent.  Patented Mar. 22, 1921.

Application filed February 17, 1919. Serial No. 277,403.

*To all whom it may concern:*

Be it known that I, EDWARD W. JANSEN, a citizen of the United States of America, residing in the city, county, and State of New York, and CARL JANDY, a citizen of the Polish Republic, residing at Jersey City, in the county of Hudson and State of New Jersey, have invented certain new and useful Improvements in Apparatus for Electric Welding, of which the following is a specification.

Our invention relates to apparatus for electric welding, and more particularly to such apparatus especially adapted for welding the joints of railway rails, although not necessarily limited thereto. The object of our invention is to eliminate the somewhat cumbersome mechanism which previously has been employed in this art, while overcoming certain disadvantages and obtaining its results in an equally efficient or better manner.

The invention more generally pertains to the class of electric arc-welding wherein a carbon electrode is employed in association with the so-called "feed-in material," usually in the form of a metal rod positioned along the line of welding, and further in association with a relatively massive bar of copper or other material of high thermal conductivity disposed closely adjacent to the said line of welding.

In the prior art, welding of this general type has been practised although with some inconvenience, due to the fact that until the completion of our invention, it was found necessary to employ the carbon electrode in connection with mechanism, the purpose of which was to hold the carbon in the desired position and move same along uniformly in order to accomplish satisfactory work. Practice has shown, however, that such prior mechanism possesses several disadvantages which are eliminated by our invention. This mechanism vibrates so as to cause the carbon to dance, which, under certain circumstances, results in defective work. Deflections of the arc due to air currents or other factors, cannot be properly compensated and certain classes of work wherein the line to be welded does not lie in or along a continuous plane, cannot be welded without interrupting the welding and readjusting the mechanism. This type of welding is practised principally for welding the rail joints of railway rails. The employment of the mechanism above referred to, necessitates the elimination of car traffic during the welding operations, besides causing loss of time and involving the necessity for transporting the comparatively heavy pieces of mechanism as the work progresses. Moreover, in said mechanism, the copper bar has been made a part of the mechanism or was held in place with hooks positioned over the head of the rail.

An ordinary welding handle equipped with a carbon electrode and used in the usual free handed manner, does not insure a satisfactory weld; the unsteadiness of the hand being such as to preclude good results. Likewise, attempts to make welds by steadying the holder on a rest, and even by gripping the holder with both hands, accomplish slightly, if any, better results.

It is the object of our invention herein disclosed to provide simple apparatus in which the disadvantages above discussed, shall be eliminated. More particularly, it is the object of our invention to provide means for obtaining results equally as good as may be obtained mechanically, and at the same time permitting car traffic to continue practically uninterrupted, while the work is going on. The welding operation, of course, will have to be suspended to let each car pass in turn.

We have discovered that entirely satisfactory work can be accomplished by employing the carbon in a hand tool, if the same be of such design that the workman's arms and hands will be relieved from supporting the greater part of the weight of the tool, so that his efforts may direct the carbon to maintain the length of arc principally with one hand and the progress of the carbon may be accomplished by the other hand.

Our invention may be more fully explained by making reference to the accompanying drawings illustrating apparatus embodying our improvements, wherein:—

Figure 1 is an enlarged perspective view of the hand implement, carbon electrode and steady rest.

Fig. 2 is a fragmentary sectional view thereof on a slightly larger scale.

Fig. 3 is a view in side elevation and partial section, illustrating a railway rail with our improved welding apparatus in position for use.

Fig. 4 is a plan view upon a reduced scale, of the welding apparatus, shown in association with a fragment of the rail ends.

Fig. 5 is a fragmentary view centrally broken away, illustrating the outer adjusting means.

Throughout the several figures of the drawings we have employed the same characters of reference to indicate similar parts.

The hand implement embodying our improvements comprises two handles, $a$, $b$, which are pivotally connected with the recessed blocks or castings, $c$, $c'$, adapted to receive the carbon electrode $d$, and are clamped about said electrode by means of the bolts $e$ and thumb nuts $e'$.

One of the handles $a$, preferably is of good electrical conductivity and, for example, may be made of copper tubing. A conductor $d'$ is attached at the terminal of the handle, while an insulating grip $e^2$ is provided at the end of the copper tubing. Ordinarily, this handle is adjusted so that its axis is substantially parallel with the axis of the carbon electrode, but it will be appreciated that both handles are freely adjustable, so that the work may be accomplished most conveniently and efficiently. Customarily, the handles are adjusted so as to form an angle; being spaced conveniently apart to suit the varying needs of the workman. Usually, the hand upon handle $a$ is employed for directing the angularity or position of the carbon, and incidentally the length of its arc, while handle $b$ at an angle with handle $a$ is used with the other hand to advance the carbon along its support, and its arc along the line of welding at the desired rate. It will be understood, of course, that the workman is provided with a suitable dark glass or helmet through which he may constantly observe the welding operation and thereby direct and advance the electrode and arc as said operation progresses.

The steady rest $f$ is adjustably supported in insulating bushings $f'$ carried in turn from the relatively massive copper bar $g$, which is held in position by the clamping device $h$ gripped securely upon the ends of the fish plate $i$ uniting the rail $j$ terminally, with its adjacent rail, in the well known manner. The rest or supporting member $f$ is designed and adapted to carry substantially all of the weight of the electrode and its holder, so that the workman may most effectively direct the welding arc. This member $f$ is adjustably mounted, as is the copper bar; the position of the latter being directly controlled by the set screws $k$, $k$, while the links $m$ and lock nuts $n$ permit the separate adjustment of the member $f$. The welding rod or "feed-in material" is shown in position at $p$, so that the arc from electrode $d$ may weld it along the beveled edge of the fish plate directly to the rail.

Preferably, the stationary apparatus is supported or rested laterally of the rails so that they are entirely free for traffic, and the attaching or gripping mechanism may be adjustable, thereby adapting it for different lengths of fish plates. As shown, the two gripping members $h$, $h'$, are connected by a compression member $q$ and an actuating member $r$. These parts are made adjustable as to length to accommodate various types of fish plate, as by the connector $o$ and bolts $o'$. Member $r$ is threaded and takes the tapped hand wheel $s$, which being turned thereon rearwardly engages the gripping mechanism and forces the jaws terminally against the fish plate to hold the apparatus in place.

It is obvious that the supporting member and bar are entirely out of the way of traffic, either as laid in their dotted line position, or as shown at the left of the drawings. The electrode holder is mainly supported by the member $f$, and is most advantageously directed by the two hands of the workman, as above described.

Having now described apparatus embodying the preferred form of our invention, we claim as new and desire to secure by Letters Patent, the following:—

1. In apparatus for electric welding, the combination with a stationary supporting member adapted to be positioned adjacent to the line of welding, of an electrode and its holder adapted to be manually advanced along said supporting member, and two handle members connected at an angle with said holder and adapted for adjusting and advancing the electrode as the welding operation is accomplished, substantially as set forth.

2. In apparatus for electric welding, the combination with a stationary supporting member, of means for adjusting it adjacent to the line of welding, an electrode and its holder adapted to be manually advanced along said supporting member, and two handle members adjustably connected with said holder for regulating the welding arc and advancing the holder and electrode along said supporting member as the welding operation is accomplished, substantially as set forth.

3. In apparatus for electric welding, the combination with a stationary supporting member, of a copper bar, means for adjusting them adjacent to the line of welding, an electrode and its holder adapted to be manually advanced along said supporting member, and two handle members connected with the holder at a divergent angle, whereby the holder and electrode may be steadied and advanced along the supporting member and the welding arc regulated, substantially as set forth.

4. In apparatus for electrically welding rail joints, the combination with a stationary supporting member, of a copper bar positioned in front of said member, means for attaching them at the side of the rail adjacent to the desired weld, and an electrode adapted to be removably positioned upon and advanced along said supporting member, substantially as set forth.

5. In apparatus for electrically welding rail joints, the combination with a stationary supporting member for the electrode, of a copper bar positioned in front of said member, means for positioning them adjacent to the line of welding, a carbon electrode, a holder and adjustable handle members adapted to be used in adjusting and advancing the electrode during the welding operation, substantially as set forth.

6. In apparatus for electrically welding rail joints, the combination with a lateral supporting member, of an adjacent co-extensive copper bar positioned in front of said member, means for attaching them to the fish plate of the rails, and arc-forming means adapted to be rested and advanced with respect to said supporting member as the welding operation progresses, substantially as set forth.

7. In apparatus for electric welding, the combination with a supporting member, of a substantially co-extensive copper or thermally-conductive bar, means for attaching them adjacent to the line of welding, a carbon electrode, a holder therefor, and two adjustable handle members for actuating the holder and electrode, substantially as set forth.

8. In apparatus for electrically welding rail joints, the combination with an adjustable clamping mechanism adapted to engage the ends of a fish plate, of an insulated longitudinal supporting member carried thereby, an electrode adapted to be supported upon and adjusted along said member, and two angularly positioned handle members for said electrode, substantially as set forth.

9. In apparatus for electrically welding rail joints, the combination with a stationary supporting member substantially co-extensive with the desired weld, means for insulatingly positioning said member laterally of the rails, arc-forming means adapted to be rested upon and advanced along said supporting member as the welding progresses, and two angularly positioned handle members for manually actuating said means, substantially as set forth.

10. In apparatus for electrically welding rail joints, the combination with an attachable insulated supporting member, of an associated copper bar substantially co-extensive with the desired weld, means for jointly attaching them laterally of the rails, an electrode adapted to be positioned upon and advanced along said member adjacent to the bar, and manual actuating means for said electrode, substantially as set forth.

In testimony whereof we do now affix our signatures in the presence of two witnesses.

EDWARD W. JANSEN.
CARL JANDY.

Witnesses:
AGNES T. GRAY,
EDYTHE F. JUDGE.